United States Patent [19]

Silverman

[11] 4,432,078

[45] Feb. 14, 1984

[54] METHOD AND APPARATUS FOR FRACTURING A DEEP BOREHOLE AND DETERMINING THE FRACTURE AZIMUTH

[76] Inventor: Daniel Silverman, 5969 S. Birmingham St., Tulsa, Okla. 74105

[21] Appl. No.: 226,891

[22] Filed: Jan. 21, 1981

Related U.S. Application Data

[63] Continuation-in-part of Ser. No. 4,167, Jan. 17, 1979, Pat. No. 4,252,209.

[51] Int. Cl.³ .................. G01V 1/24; G01V 1/22; E21B 43/26
[52] U.S. Cl. .................. 367/37; 166/249; 166/308; 367/14
[58] Field of Search .............. 166/249, 308; 181/106, 181/111, 104; 367/14, 21, 75, 56, 58, 37

[56] References Cited

U.S. PATENT DOCUMENTS

| | | | |
|---|---|---|---|
| 2,678,107 | 5/1954 | Woods | 367/58 |
| 3,923,099 | 12/1975 | Brandon | 166/249 |
| 4,044,828 | 8/1977 | Jones et al. | 166/308 X |
| 4,048,612 | 9/1977 | Lawyer | 367/56 |
| 4,280,200 | 7/1981 | Silverman | 367/75 X |

Primary Examiner—S. C. Buczinski
Assistant Examiner—K. R. Kaiser
Attorney, Agent, or Firm—Daniel Silverman

[57] ABSTRACT

A method of fracturing a deep borehole to form a vertical fracture, and of determining the azimuth of the resulting fracture, comprising pumping a pressurized fracture fluid into said well through a pipe from the surface, to provide a bottom hole pressure P which is less than the normal fracturing press (NFP), and generating a series of sharp pressure pulses (SPP) of selected magnitude, such that when added to the pressure P, provide pressure peaks greater than the NFP. By providing arrays of seismic sensors at the surface and determining the direction of propagation of the seismic waves generated by the SPP, the azimuth of the fracture can be determined.

25 Claims, 12 Drawing Figures

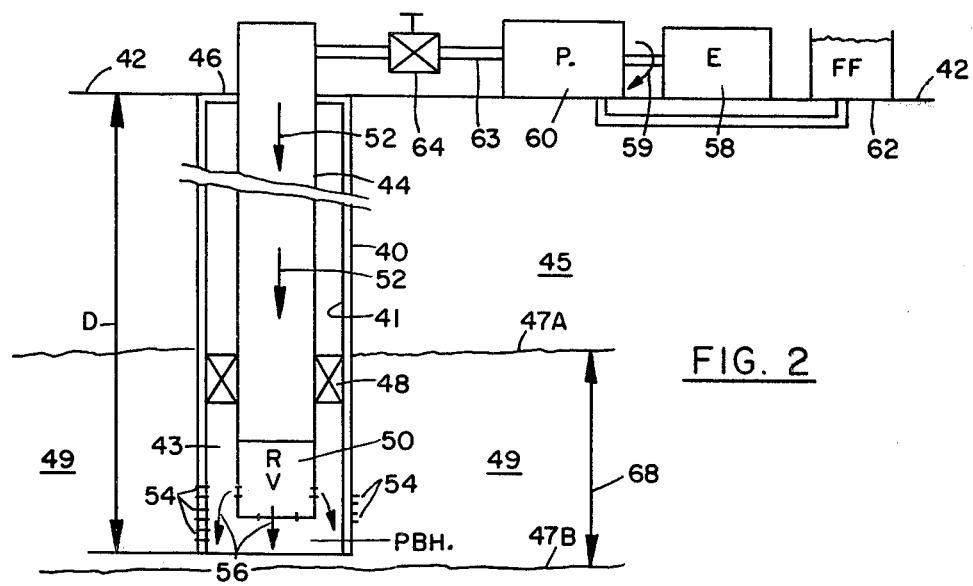
FIG. 2
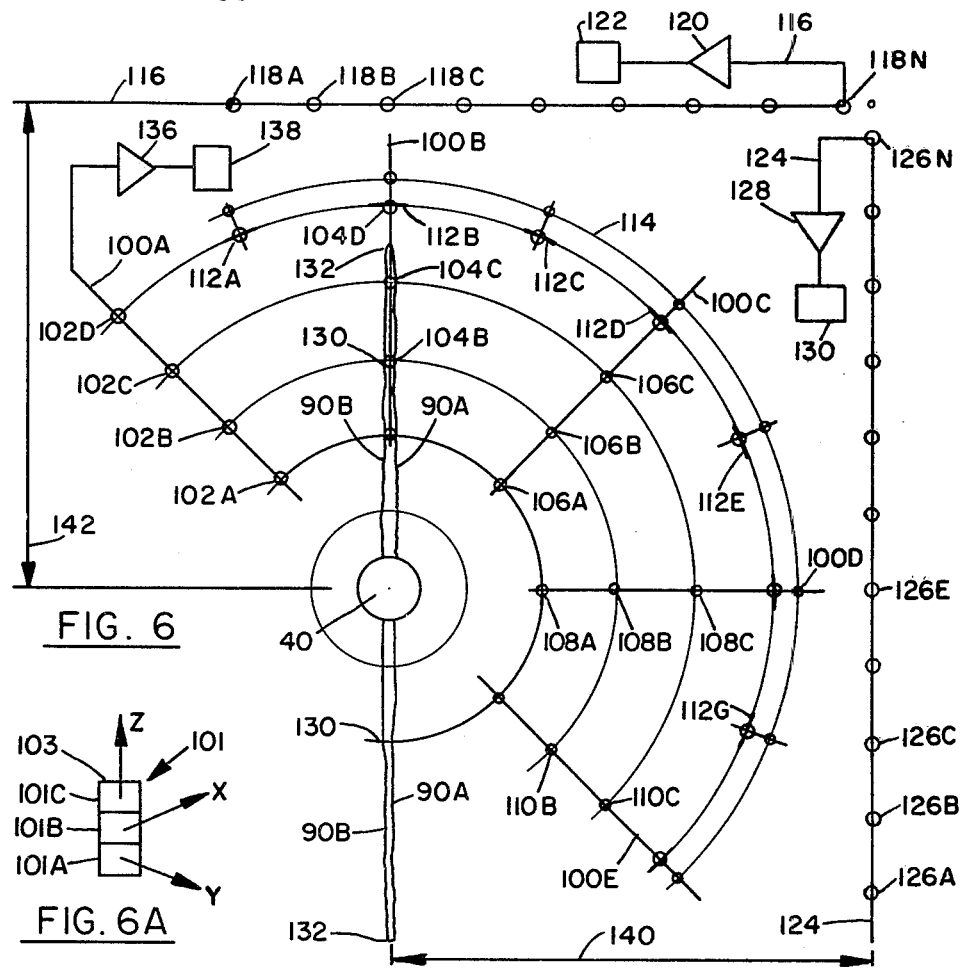
FIG. 6
FIG. 6A

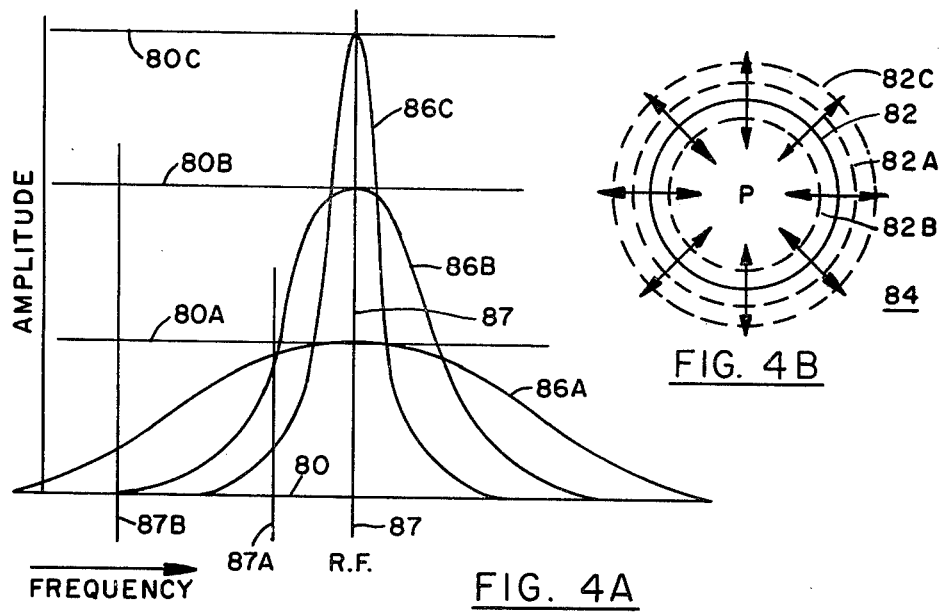
FIG. 4A
FIG. 4B
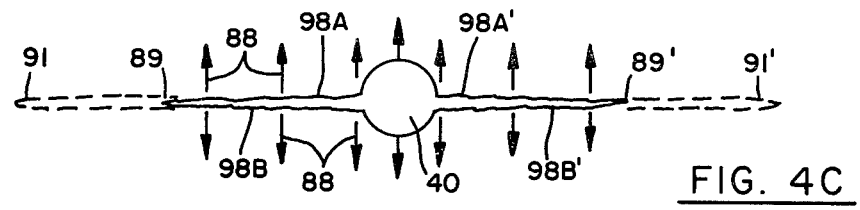
FIG. 4C
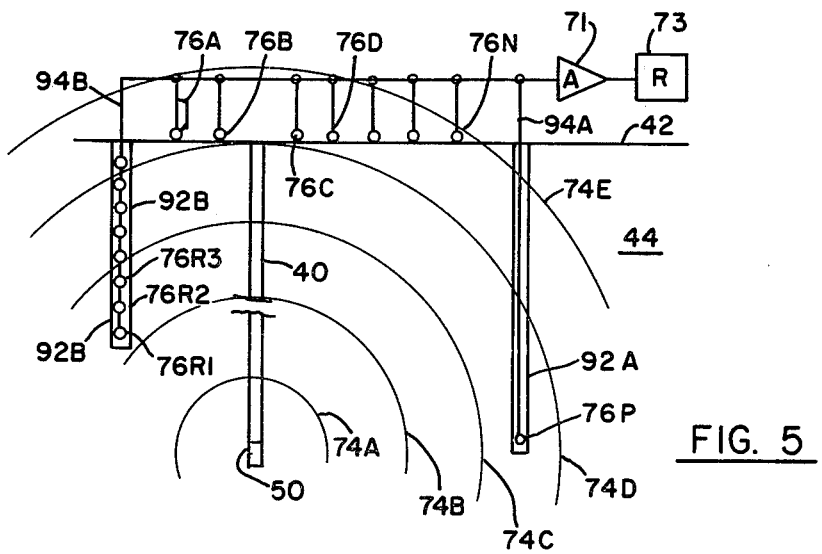
FIG. 5

METHOD AND APPARATUS FOR FRACTURING A DEEP BOREHOLE AND DETERMINING THE FRACTURE AZIMUTH

CROSS REFERENCE TO RELATED APPLICATION

This application is a continuation-in-part of my co-pending application, filed Jan. 17, 1979, Ser. No. 4,167 now U.S. Pat. No. 4,252,209, entitled "DOWNHOLE LIQUID PRESSURE SEISMIC SOURCE AND BIT POSITIONING SYSTEM", to which reference is made.

This application is also related to U.S. Pat. Nos. as follows:

3,993,974 issued to Daniel Silverman et al Nov. 23, 1976; entitled: "SEISMIC METHOD FOR DETERMINING THE POSITION OF THE BIT ON A DRILL STEM IN A DEEP BOREHOLE;

3,979,724 issued to Daniel Silverman et al Sept. 7, 1976 entitled: SEISMIC METHOD FOR DETERMINING THE POSITION OF THE BOTTOM OF A LONG PIPE IN A DEEP BOREHOLE;

3,979,140, issued to Daniel Silverman et al Sept. 7, 1976 entitled: SEISMIC METHOD FOR LOGGING POSITION OF A DEEP BOREHOLE IN THE EARTH;

4,040,003 issued to P. A. Beynet et al under date of Aug. 7, 1977, entitled: DOWNHOLE SEISMIC SOURCE;

U.S. Pat. Nos. 3,993,974; 3,979,724; 3,979,140; and 4,040,003 are inserted by reference into this application.

BACKGROUND OF THE INVENTION

1. Field of the Invention

This invention is in the field of hydraulic fracturing. More particularly, it is concerned with the fracturing of the rocks in deep boreholes in the earth. Still more particularly, it is concerned with the fracturing of oil wells.

Still more particularly, it concerns the art of generating high pressure hydraulic pulses in deep boreholes and using these pressure pulses to produce fractures using less pump power than is normally now required.

Still more particularly, it concerns the use of sonic detecting means to detect seismic waves generated at the fracture by these pressure pulses, to determine the azimuth and length of the fracture.

2. Description of the Prior Art

The process of hydraulic fracturing (also called "hydrofracing" or "fracturing") of oil and gas wells has been in common use over the past 20-25 years, with great economic results. In all of these operations, high pressure liquid pumps are used to pump a selected fluid, generally called a fracturing fluid, which may be an oil or water solution with or without thickening agents and generally including a so-called propping agent, such as sand, etc. All of this art is well known and is taught in textbooks and technical papers and need not be described further.

In the course of the fracturing operation, one or more pumps are connected to a manifold and to a "pipe" (such as drill pipe or tubing) in the well. The pipe is packed off to the wall of the well at a selected depth to apply the hydraulic pressure to a selected portion or zone in the well. This zone can be at the bottom, or at some intermediate depth in the well. The well can be cased (with perforations), or uncased.

The procedure is to build up the pressure and flow rate of the fluid being pumped until a selected hydrostatic pressure is reached at the packed off zone, at which the rock will spontaneously fracture, along a plane of weakness of the rock. When this happens, the hydraulic pressure drops to a lower sustained value.

SUMMARY OF THE INVENTION

It is a primary object of this invention to provide a method of fracturing a deep well with lesser pressure pump capability.

It is a further object to fracture a deep well, by the combination of a lower steady hydraulic pressure plus one or more time-spaced pressure pulses, such that the peak pressures create incipient fractures, which are then opened wider, by the steady pressure.

It is also a further object of this invention to produce a series of pulses, of selected frequency, to set up an oscillation in the rock wall of the borehole, and to create a resonance, such that a fracture will form at a lower steady pressure.

It is a still further object of this invention to detect the seismic waves generated by the vibration of the walls of the fracture, under the pulsating pressure, to make a determination of the fracture azimuth and length of the fracture.

These and other objects are realized and the limitations of the prior art are overcome in this invention, by carrying out conventional procedures as to setting pipe in the borehole and packing off between the pipe and the formation at a section of the borehole, connecting pumps to the pipe at the surface, etc.

The principal difference between the method of this invention and conventional procedure in hydrofracturing is to supply a steady, or average, hydrostatic pressure PA, at the formation, which is less than the normal fracturing pressure (NFP) for a given geological situation. This pressure would never fracture the rock by itself. In addition, means are provided for generating at the selected section, a short time duration, high sharp pressure pulse (SPP) which, superimposed on the steady pressure PA, will provide total pressure peaks PPT, which are higher than normal fracture pressure (NFP).

In this way a lower power pump capacity will be required, or a higher flow rate of fracture fluid can be provided at the same cost. Also, under the lower steady or average pressure, there will be less fluid leaking off through the pores of the rock.

By the use of sharp high pressure peaks, such as might be provided by waterhammer effect, or shock forces, the fractures will be extended with a lesser steady pressure.

The invention also includes the use of a series of time-spaced pressure pulses, at selected frequencies, so as to set up resonating conditions, which could fracture at a still lower steady pressure.

There are a number of types of apparatus that could be used to generate the pressure pulses. One would be to use apparatus such as disclosed in U.S. Pat. Nos. 3,993,974; 3,979,724; 3,979,140; and 4,040,003 to generate the "explosive" type forces at the bottom of the borehole.

Also, as fully described in my co-pending application, Ser. No. 4,167, a rotary or translatory valve can be placed in the bottom of the pipe, so that periodically, at selected time intervals, the flow of well fluid can be at least partially cut off, or preferably, completely cut off, or a very short time, and then opened again. This will enerate very high pressure waterhammer pressures of ny selected magnitude, depending on the flow rate, peed of closing and opening of the valve, and the time nterval between closing and opening.

Another method would be to set up in the pipe a ongitudinal resonance that would open and close a lurality of ports between the pipe and a surrounding tationary sleeve.

BRIEF DESCRIPTION OF THE DRAWINGS

These and other objects and advantages of this invention and a better understanding of the principles and letails of the invention will be evident from the following description taken in conjunction with the appended lrawings, in which:

FIG. 2 illustrates one embodiment of apparatus required to fracture as well by the method of this invention.

FIGS. 4A, 4B, and 4C illustrate the vibration and esonance relations in this invention.

FIG. 5 illustrates possible arrays of seismic sensors in vertical cross-section of the earth, through the borehole to be fractured.

FIGS. 6 and 6A illustrate several types of seismic ensor arrays by means of which the direction of propagation of the seismic waves can be determined.

DESCRIPTION OF THE PREFERRED EMBODIMENT

Figure 1:
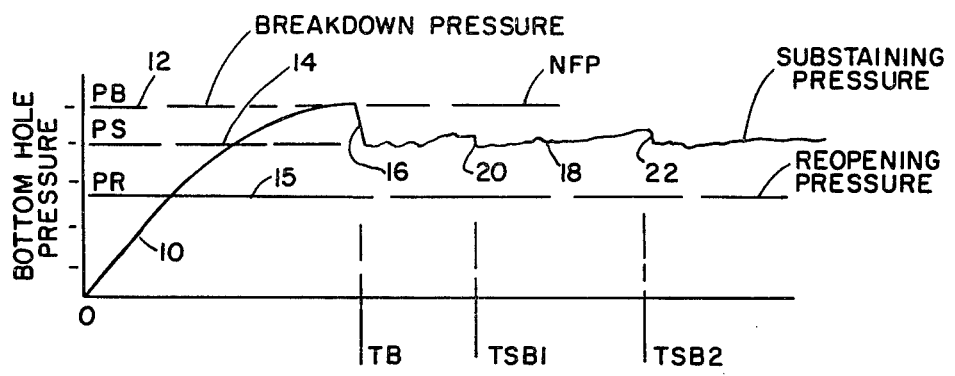
FIG. 1 illustrates the pressure vs. time relations of the prior art method of fracturing deep wells.

Referring now to the drawings, and in particular to FIG. 1 which is taken from the prior art, the curve of bottomhole pressure 10 vs. time is shown for a typical racture of the rock at or near the bottom of a deep borehole.

The bottomhole pressure rises along the curve 10 until it reaches a value of pressure corresponding to the breakdown pressure PB, 12. This pressure also can be called the "Normal Fracture Pressure" or (NFP), for a borehole in the specific type or rocks found at a selected depth.

It is well known that at shallow depths, say from 750 to 1500 feet, the pressure will lift the overburden and form a horizontal fracture rather than form a vertical racture. At depths below about 1000 feet or so, the overburden requires a much higher pressure to be lifted han the pressure required to form a vertical fracture. Thus the rock preferentially fractures in a vertical plane, the azimuth of which is dependent on the direction of the minimum principal stress in the rock.

The direction of the minimum principal stress is not known in advance of the fracture of the rock, so that the actual azimuth of the plane of the fracture, after it is formed, is unknown. The azimuth of the fracture, and the horizontal length of the fracture are both unknown, and, being of great importance in the practical development of an oilfield, for example, must be determined.

This invention also covers a seismic method of determining the azimuth and length of the vertical fracture.

At the time TB the rock splits, or breaks down, and the fracture has started. Once the rock in the vicinity of the well bore has been opened, the pressure required to extend the fracture, or the sustaining pressure, PS, 14, is less than PB, 12. Thus, the bottomhole pressure drops to PS; and as fluid is pumped into the well, the length of the fracture increases. There may be minor increases such as at 20, 22, as TSB1 and TSB2, respectively, where PS might rise a small amount over the average value, or the pressure PS might remain quite constant.

It is also known that after a well has been fractured with proppant, and after the pumping is stopped and the pressurized fluid has leaked off into the rock and the fracture has closed onto the proppant, the fracture can be opened again by pumping fluid in at a still lower pressure PR, 15, the reopening pressure.

Now, consider FIG. 2, which shows a borehole 40 in the earth 45, with casing 41 from the surface 42 down to a depth D, with perforations 54 opening the annulus 43 of the well to the formation 49 with upper and lower interfaces 47A, 47B. A length of pipe 44 is hung from the top 46 of the casing. The pipe may be drill pipe, or tubing, etc. as is well known in the art. The pipe 44 is packed off 48 between the pipe and the casing, as is well known in the art. This is all conventional and need no be described further.

When conventional fracture fluid is flowed into the pipe 44 by means of pump 60, driven by engine 58 through shaft 59 on the surface 42 of the earth 45, the fracture fluid flows from tank 62 through pump 60, through pipe 63, valve 64, into the pipe 44, and flows down the pipe in accordance with arrow 52.

Numeral 50 illustrates a box near the bottom of the pipe 44 containing a means (to be described) that can create sharp, short-time-duration, high pressure pulses, or SPP's. This should preferably be a shock pressure, such as might be generated by a small quantity of explosive, or the sudden release of a volume of compressed gas or liquid. Of course, the entire volume of the packed off section is completely filled with the pressurized fluid, and the pressure is exerted through the perforations 54 against the rock wall of the selected geological formation 49, within the boundaries 47A, 47B of which the fracture is to be formed.

I call the pressurized medium a fluid, althought it most probably is a liquid, rather than a gas. At much shallower depths it could equally be a gas. However, it is not necessarily a simple liquid, but may be what is called a fracturing fluid. Such a fluid may have chemical additives to make it thicker, or more viscous, so that it will not flow too easily through the pores of the rock 49. Also, the fluid may often contain sand or other granular propping material to maintain a minimum width of the fracture after the fluid pressure is released.

Figure 3:
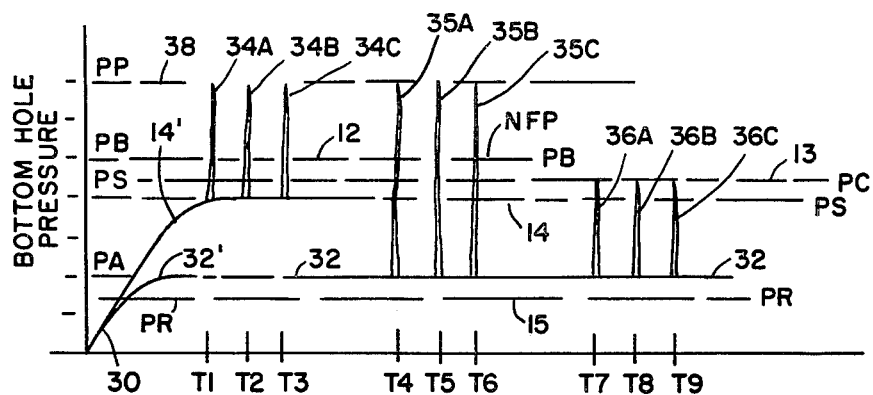
FIG. 3 illustrates the pressure vs. time relations in this method.

Now consider FIG. 3, which is a variation of FIG. 1 to show the effects of the SPP's generated by the means 50. But first let us consider again the three pressures PB 12 (or NFP), PS 14, and PR, 15. PB is the breakdown pressure or normal fracturing pressure. In that kind of rock at the depth pressure of NFP will cause a breakdown or fracture.

Once the fracture is started, a sustaining pressure PS of a lesser magnitude than PB or NFP will extend the fracture (in length), since the process of extending an already existing fracture requires a lower value of pressure than NFP.

Now consider that the fracture has been formed at pressure NFP, and extended at pressure PS, and has been propped, but the fluid pump has been stopped and the fluid pressure has leaked away and there is nothing holding the fracture open except the proppant, and the walls of the fracture are forced together by the compressed rock behind them.

If we wish to open the fracture again it will be clear that a fluid pressure PR or reopening pressure 15 will be required to further compress the rock walls and open the fracture wider. However, since there is no "fracturing" in this operation, it will be clear that PR will be less than PS, which is less than NFP.

Consider in FIG. 3 that a fluid pressure 14 is being exerted on the wall of the borehole. The fracture will not form, nor can it be extended. Next, by means 50 we generate one or more SPP's, such as 34A, 34B, 34C, etc. of times T1, T2, T3, etc. These are drawn to show that when the peak pressure of these pulses 34 when added to PS, produce a total peak pressure PP, 38. Since the PP is higher than PB, 12, therefore, the rock should fracture; and with the bottom hole pressure PS, should be extended without using additional SPP's. Now, consider that the bottomhole pressure applied by the fluid pump is equal to PA which is equal to or slightly greater than PR, the pressure to reopen a fracture. Now, if we add SPP's 35A, 35B, 35C, etc. which when added to the pressure PA will reach the same PP 38, as did SPP's 34 when added to PS.

Thus the peaks 35 should provide the initial fracture of the rock as did peaks 34. In the case of peaks 34 the sustaining pressure PS is present, so that the fracture will extend without further SPP's. But with the bottomhole pressure (BHP) equal to PA, which is less than PS but greater than PR, the fracture will not extend. But if the SPP's 35 are continued, even though PA is less than PS, the fracture will extend as more fluid is pumped into the fracture.

With the BNP equal to PA which is greater than the reopening pressure, it should probably not require SPP's which are greater than PB, but only greater than PS, such as with SSP's 36A, 36B, 36C, etc., at times T7, T8, T9.

In review, whereas the conventional system of fracturing requires a pump that can put out a selected maximum fluid flow, at a maximum pressure greater than PB.

With the maximum pressure equal to PS, the fracture can be initiated and extended at a pressure less than PB if the SPP's can bring the peak pressure to be greater than PB. In this case the SPP's can be stopped and the pressure PS will continue to extend the fracture.

With the average BHP equal to PA, which is greater than PR, but less than PS, nothing will happen until SPP's are provided with a peak pressure of PP 38, which is greater than PB, the breakdown pressure. But with pressure PA, the fracture will not continue to extend, unless the SPP's are continued. However, they need not provide a maximum of PP, but only be greater than PS.

If a continuing series of SPP's are used to cause breakdown, it will help the process greatly to make the frequency of the SPP's a selected value which is equal to or near to the frequency with which the wall of the borehole resonates.

It is well known that an elastic system will respond to a force by taking a strain, which is proportional to the force. This is shown in FIGS. 4A, 4B, and 4C. FIG. 4A shows the amplitude of strin vs. frequency, within the elastic limit.

In FIG. 4B the case for a circular borehole 82 in a large body of rock 84 is shown. When a selected pressure is applied to the closed borehole, the rock will elastically compress and the circumference 82 will expand out to dashed line 82A. If the interior pressure is reduced slowly, the circumference will move inwardly to the original 82. On the other hand, if the pressure is released very rapidly, the circumference will rapidly contract and may actually become equal to the dashed circle 82B which is smaller than 82. There will be a slight oscillation and the wall will come to rest at 82. The frequency of this oscillation is the natural frequency of the rock body in the configuration shown.

Now, if we pulse the pressure P in the borehole at the resonance frequency, the amplitude of oscillation will increase and may become like 82C which can be many times the amplitude of 82A, for example. If this larger amplitude of strain is greater than the elastic limit, then fractures in the rock could occur.

FIG. 4A shows the resonance curves 86A, 86B, 86C which are centered about the resonance frequencies 87. Depending on the amount of internal energy loss or damping, the curves can have a very large amplitude of oscillation, such as 86C, for example, which can cause failure or fracture in the rock with greater damping, the resonance curves may take the form of 86B or 86A. If the frequency of driving the system is different from, but close to the resonance frequency 87, say 87A, amplitude of oscillation is reduced but still large, and so on. This is well known in the art and need not be described further.

FIG. 4B illustrates the kind of oscillation that one might get of the borehole wall under one kind of excitation. If the opening were out of round, or elliptical, a different form of oscillation would occur. Once the fracture had been started, as in FIG. 4C, then a still different pattern of oscillation would occur, such as oscillation of the two substantially plane parallel walls, such as 98A, 98B, and so on.

Thus it will be clear that exciting the borehole and/or fracture at the resonance frequency is very advantageous. However, it is very probable that there is no way of determining in advance what this frequency will be so that a source of SPP's of variable frequency would be very desirable. Also, it is quite likely that the resonance frequencies of the conditions in FIGS. 4B and 4C would be quite different. Also, the resonance frequency of FIG. 4C would depend on the length of the fracture, and so on.

Figure 7:
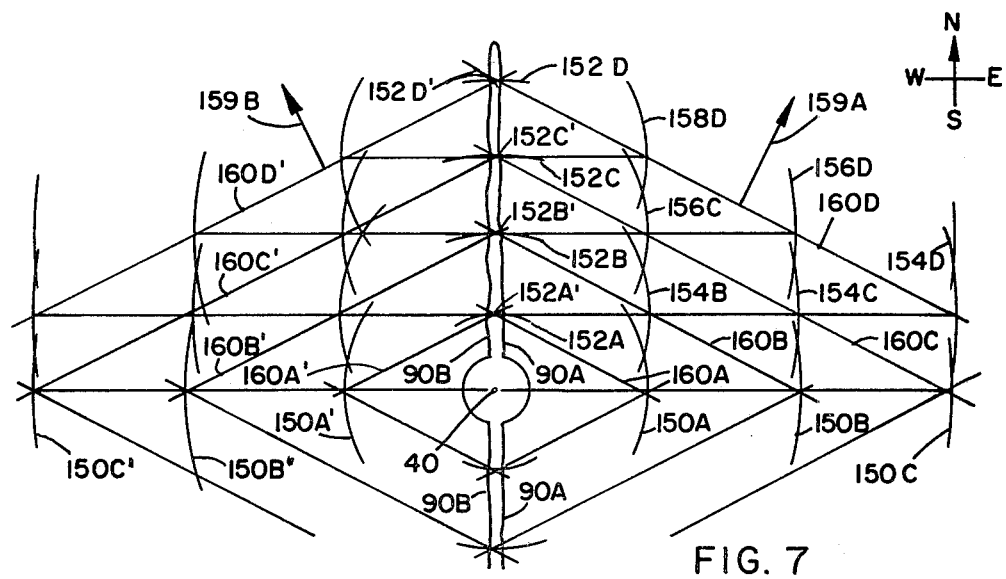
FIG. 7 illustrates the types of wave fronts to be expected in the use of the SPP, from the measurement of which the azimuth of the fracture can be determined.

How does one determine when resonance is reached as the frequency is varied? This will be fully described in relation to FIGS. 5, 6, and 7.

While the matter of the means 50 of FIG. 2 that provides the sharp pressure pulses (SPP's) is of extreme importance in this invention, I will leave that for later description, in terms of FIGS. 8 and 9, and proceed with further description of this invention on the supposition that we have such a means 50.

The SPP's are preferably shock pressures, which are ideal sources of elastic waves in the earth, better known as seismic waves. Consequently, each of the SPP's will act as a source of seismic waves, which will propagate wavefronts outwardly from the borehole, as shown in FIG. 5, which illustrates a vertical section through the borehole, and in FIG. 6, as a plan view of the surface 42 f the earth 45. In both figures the borehole is indicated s 40.

Before there is a fracture, since the size of the means 0 will be very small compared to the depth of the orehole and the wave length of the seismic waves, ney will be substantially spherical and will expand utwardly and upwardly, as in FIGS. 5 and 6. This ime generation of spherical waves is shown in FIG. B, due to the outward push and relaxation of the wall 2 of the borehole.

As a seismic source, the energy and therefore amplide of the seismic waves will be a function of the magitude of the SPP and its sharpness, or rate of rise of ressure; that is, why a shock force is desired. Therere, the amplitude of vibration, as shown in FIG. 4A, is nportant.

Shown on FIG. 5 are arrays of seismic sensors, such s geophones, 76, which will be positioned on or near ne surface of the earth. These can also include sensors ich as 76P lowered into deep boreholes such as 92A in ne earth, near to the borehole 40 being fractured. Also, ong vertical arrays, such as 76R, of sensors may be owered into shallower boreholes such as 92B. The ensors provide electrical signals which are functions of ne seismic signals. The electrical signals can be proessed, filtered, stacked, etc. to provide important information as to the direction of propagation of the seismic aves. Knowledge of the direction of propagation of ne waves is related to the directions of arrival of the aves at the arrays of sensors. Thus, knowing the positions of the various sensors with respect to each other nd to the source, and measuring the relative times of rrival at each of the sensors, provides information egarding the size, shape, and position of the source.

In general, there are at least two ways of obtaining iformation as to the direction of arrival of waves and f their nature. One is to provide at a given reception oint a group of two or preferably three sensors, with neir axes of sensitivity mutually at right angles to each ther. Knowing the precise angular positions with reect to the source of the axes of sensitivity of the multile sensors, or more particularly the azimuths and opes of the axes of sensitivity of each of the multiple ensors (or separate components of a multiple component sensor), permits determination of the direction of rrival of the wave front to the multiple component nsor, As shown in FIG. 5, the electrical signals from the nsors 76 go to a multichannel seismic amplifier 71 and corder 73. The amplifiers and recorders are conventional in all respects and may be analog or digital, but referably would be digital and the recorders multiple nannel digital records, all of which are well known in ie art.

FIG. 6A illustrates a conventional 3-component geonone 101. It has a cylindrical case 103, with 3 component geophones 101A, 101B, 101C, each one orientated one of the 3 possible orthogonal axes X, Y, and Z, etc. is well known in the art.

The second method involves using 2-dimensional rays of sensors and determining from a recording of ne electrical signals from the sensors, the relative times ' arrival of the wave fronts at each of the sensors.

There are many types of two-dimensional arrays. One ich array shown in FIG. 6 is composed of the two near arrays 116 and 124, with the arrays of geophones 18A, 118B, 118C, etc. and 126A, 126B, 126C, etc., spectively. The signals from these sensors go to conventional amplifiers and recorders 120, 122, and 128, 130 respectively for later processing. The two arrays are preferably at right angles to each other and equally spaced 140, 142 from the borehole 40. A preferable arrangement (not shown) could be 4 arrays in a square with the borehole 40 at its center.

Another array would be a circular array with its center at the borehole 40, 112A, 112B, 112C, ... 112G. These sensors are shown as 2-component horizontal sensors with the axis of sensitivity of one sensor of each pair directed in a vertical plane through the borehole. The other axis is, of course, tangential to the circular array.

Still another seismic sensor array would comprise a plurality of linear radial arrays, preferably equally spaced in azimuth, such as 102, 104, 106, 108, 110, etc. These arrays would preferably extend completely around the borehole. The sensors in each radial array would preferably be at the same radial spacings in each radial line. In this way the radial arrays could also be considered as a plurality of circular arrays, at equally spaced radial distances.

Complete circumferential symmetry of the arrays is preferred since these signals are to be used to determine the azimuth of the fracture 90A, 90B, shown in FIG. 6 as in a north-south plane.

Incidentally, in FIG. 6, it would be advantageous to position a vertical array (such as 76R in FIG. 5) at the intersection of the two arrays 116 and 124, and so on.

Before the fracture is formed, there will be a spherical wave centered at the source 50, approaching the surface. Thus a circular array as in FIG. 6 will show the arrival of the wave at each of the sensors at the same instant.

Of course, any or all of the sensors can be compressional wave, or shear wave, sensors, as is well known in the art.

While I show large arrays of sensors, these are required in order to determine directions of travel. However, if it is desired to determine what the frequency of repetition of the source is, or whether the oscillation of the rock is near its resonant frequency, only a single sensor, or at most a few sensors, would be required. As the geophone sensors were recording the seismic waves, the frequencies of the source 50 would be evident from the recorded signal. If further, the frequency of the source could be varied, then determination of the resonance frequency could be determined from the change in amplitude of the recorded signal, as the frequency was varied.

Consider the two conditions, or states of the fracture shown in FIGS. 4B and 4C. It will be clear that due to the very different configurations of the simple cavity 82 in FIG. 4B, before the fracture, and the cylindrical cavity plus the fracture 90A, 90B of FIG. 4C, the resonance frequencies will be quite different from each other. They would also be different from a condition like FIG. 4C with length 89, 89' but with greater length of fracture 91, 91'. Thus, the resonant frequency can be used as an indicator to distinguish between one configuration or the other of the borehole fracture, and also to provide information as to the length of the fracture.

It will be clear also that before the fracture is formed, as in FIG. 4B, the effect of the SPP's is to provide a circular or cylindrical pulsating wall, if the vertical length is short, or, in effect, a pulsating sphere. However, once the fracture has started as in FIG. 4C, there will be (for a section of fracture near the borehole) two oppositely moving parallel, substantially planar walls. Then as the fracture lengthens, shock fronts or SPP's will travel out through the liquid in the fracture, and create compressional waves in the rock, moving as spherical waves from adjacent points along the fracture, as the shock wave moves out at its own velocity in the liquid in the fracture. At the same time there will be a strong spherical compressional wave for each SPP centered at the borehole.

It will be clear that the compressional waves in the rock due to the movement of the pressure front in the liquid, out along the fracture, will be from displaced centers. They will also originate at delayed times due to the travel of the pressure front in the liquid. Since the travel of the pressure front in the liquid will be at a much lower velocity than the velocity of the elastic waves in the rock; these elastic waves generated away from the borehole will have a different direction of propagation from those centered at the borehole and should be separately detectable with the proper combination of radial, circumferential, and tangential arrays as shown in FIGS. 5 and 6.

This is illustrated in FIG. 7, which illustrates the elastic wave fronts, or seismic wave fronts, resulting from the SPP's. In the drawing it is assumed that the shock wave in the rock travels at about twice the velocity of the shock waves in the liquid in the fracture.

Before the fracture is formed, there will only be spherical wave fronts, such as 150A, 150B, 150C, etc. moving to the east and west. The north and south portions are not shown, to make the diagram clearer. The circles show successive positions, at successive intervals of time of a single wave from a single SPP.

After the fracture 90A, 90B is formed for each SPP, there will, as before, be a spherical wave moving at equal units of time, from 40 to 150A, 150B, 150C, etc. There will also be a shock wave moving, say to the north along the fracture 90. However, when the spherical front reads 150A, the shock wave in the liquid will only reach to 125A.

As it moves, it will push apart the walls 90A and 90B generating spherical waves in the rock as it goes. Consider the shock wave reaching 152A and starting a spherical wave at 152A. This wave will expand to 154B at the end of the second interval, when the original spherical wave has reached 150B. At the end of the second interval the shock wave will have reached 152B.

The line 160B is drawn through wave front positions 150B, 154B, and point 152B and represents a wavegroup front 160B. This represents the position of a group of wave fronts from 150B to 154B, to one just starting at 154B. This wave group line travels northeasterly, as indicated by arrow 159A, to take up successive positions at 160C, 160C, and so on. There are also successive positions 160A', 160B', 160C', 160D', and so on, moving 149A, forming a mirror image of those on the northeast. Also, because the fracture also extends to the south, there will also be a system moving to the southeast and southwest, not fully illustrated. These wave group fronts 160 correspond to the wave groups set up by a supersonic missile in the air.

It will be clear that these wave group fronts can only exist if there is a fracture filled with liquid, through which the shock wave can travel. If there is no fracture, these wave group fronts will not exist. If they can be detected, it is proof of the existence of the fracture. If they can be detected, then their directions of travel, 159A, 159B, will indicate the azimuth of the fracture.

The symmetrical arrangement of 159A and 159B and their equal energy are dependent on a truly vertical fracture. If the fracture is tilted in a direction perpendicular to its plane, then the wave group fronts will not be equal in energy (east vs. west) and their differences will indicate the direction and magnitude of tilt of the fracture, and so on.

As previously mentioned, when there is a fracture started, there should be a combination of spherical wves from the source of the borehole and waves originating from the outward movement of the SPP's along the fracture. One object of the processing would be to recognize this special type of wave front. To do this the radial arrays of FIG. 6 would be useful. If the signals are weak, then compounding, or stacking, of the outputs of the sensors in each array will provide added sensitivity to the outward velocity of the waves resulting from the SPP's in the liquid of the fracture. One way of doing this would be to delay and sum the consecutive sensors, varying the delay times until a maximum sum is provided. This art is well known in the seismic industry and need not be described in greater detail.

So far I have described two separate but related uses of the SPP's or shock waves. The first is for facilitating fracturing at lower pump pressures. The second is for generating elastic waves in the rock, which can be detected by suitable arrays of sensors, to provide information related to the formation of the fracture, and its configuration. Of course, while the well is being fracture, the SPP's can be used for both purposes. After the fracture is formed, and can be pressurized, it can then serve for the purpose of mapping the configuration of the fracture I know of no art that shows precisely this invention, so that I feel that I can claim broadly the use of an in-hole source of SPP's in combination with a pressurized substantially vertical fracture, in combination with a selected 2-dimensional array of sensors. This would be irrespective of the particular arrays of sensors that would be used.

While the use of the SPP's for fracturing may require continuous and variable rate production of SPP's, particularly for obtaining resonance, it will be clear that the seismic detection of the configuration of the fracture only requires isolated or random SPP's.

However, it is my objective to use repetitive SPP's for the seismic operations, since such repetitions would permit adding or stacking of the seismic records, in order to provide a record of higher signal-to-noise ratio from which more precise conclusions can be drawn.

It will be clear that the seismic recording and processing previously described can be carried on while the fracturing process is being carried on, so that the instant of fracture formation and the extension of the fracture can be monitored seismically.

It is also clear that the seismic recording and processing described can be carried out at any time after the fracture has been formed and extended. This could be immediately after the fracture is formed, while the pipe is still in the borehole and the fracture pumps are still connected.

The seismic operations to determine azimuth of the fracture, etc. can also be carried out days, months, or even years later, provided that a suitable source of SPP's is provided, and the fracture can be pressurized.

While I call for a pressurized fracture, I mean a width of fracture opening sufficient to permit travel of the shock wave through the liquid in the fracture. Of course, the wider the fracture, the greater the shock energy that can be transmitted, although it is possible that a fracture that is held open by suitable proppant can also be used without additional pressuring. All that is needed is a fracture with selected opening width.

As regards the source of the SPP's, they can be anything from small explosive charges, electromagnetically driven diaphragms or magnetic striction devices. They can also be one of the many types of ceramic electrostation devices. These could be assemblies lowered on suitable cables into the borehole, and powered from the surface. One such type of device supported by cable means is illustrated in my U.S. Pat. No. 3,979,140. This is a "water gun" having a very rapidly moving shuttle valve that explosively releases pressurized fluid into the well liquids under bottomhole pressure of a column of liquid.

Another method of generation of shock waves in the borehole is illustrated in my U.S. Pat. No. 3,979,724. This requires a continuous pipe filled with liquid extending to the depth of the fracture. However, the liquid need not be moving.

Another method is illustrated in my U.S. Pat. No. 3,993,974. This depends on water hammer effects, and, of course, requires a dynamic fluid situation.

The Beynet et al U.S. Pat. No. 4,040,003 illustrates still other apparatus, which under certain conditions might be useful.

U.S. Pat. Nos. 3,979,140; 3,979,724; 3,993,974; and 4,040,003 are entered by reference into this application.

Figures 8, 9:
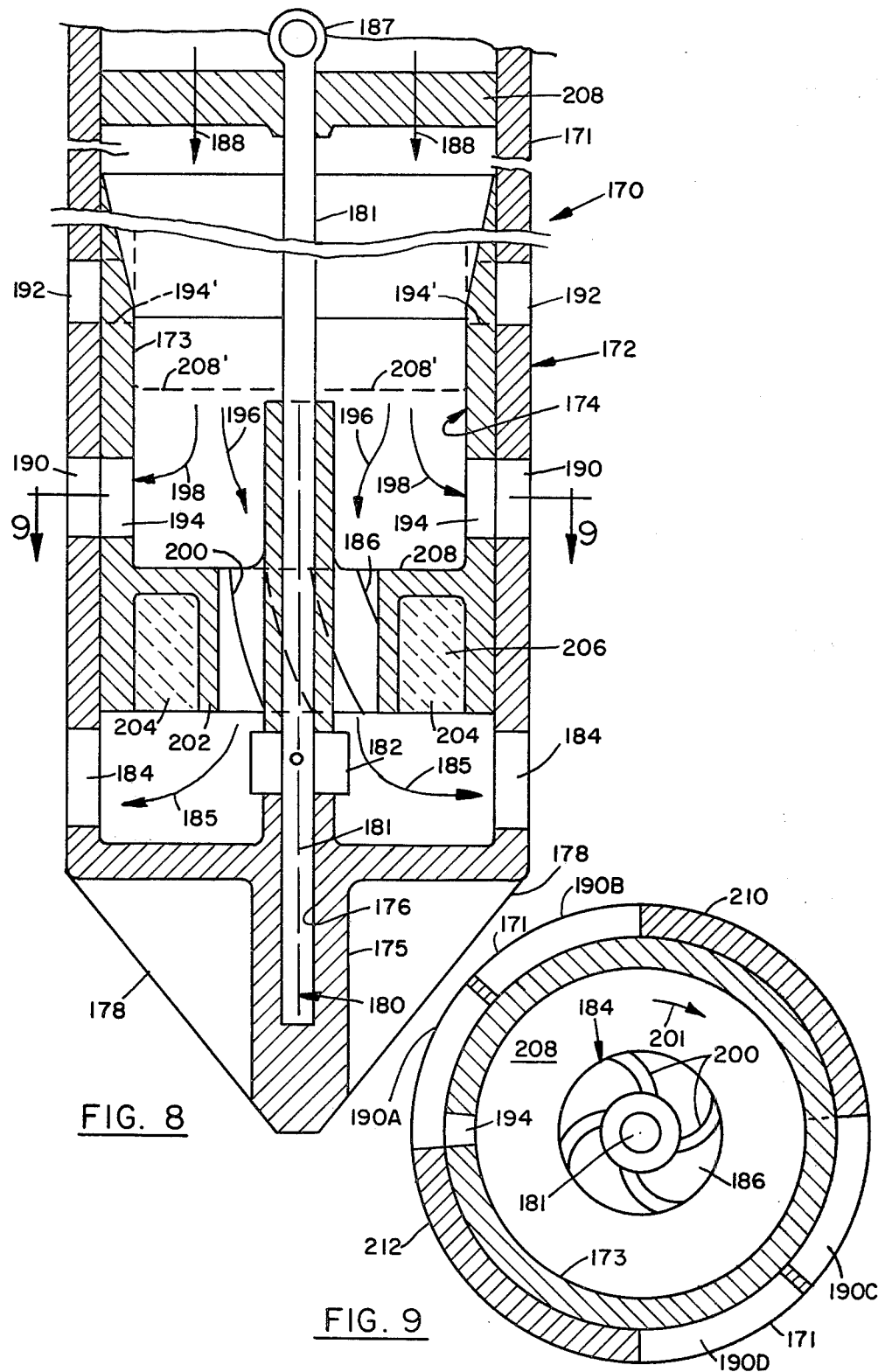
FIGS. 8 and 9 illustrate in vertical and horizontal cross-sections respectively, one embodiment of a rotary waterhammer valve that could be used to produce the SPP needed in this method of fracturing.

Another method and apparatus, illustrated in FIGS. 8 and 9, is a variation of the apparatus which forms the basis of the inventions in my co-pending application, Ser. No. 4,176, filed Jan. 17, 1979, of which this application is a continuation-in-part.

Illustrated in FIGS. 8 and 9 is a source of shock waves illustrated generally by the numeral 170. It comprises an outer pipe 172 which can be a continuation of a long pipe 171 in the borehole from the surface, through which fracture fluids, or other liquids can flow under pressure.

A rotor indicated generally as 174 is adapted to rotate on suitable bearings, not shown, but well known, about a central post 181 which is held concentrically in the opening 176 in the base 175. The rotor has a thrust bearing (not shown but well known in the art) resting on the collar 182 of post 181.

The rotor has a thick base 208, partly to provide flywheel effect. However, the dashed shaded annular volume can be removed, if desired. There is a central open portion 186 of selected diameter which has internal curved vanes 200 which form a turbine.

Pressurized liquid flows down the pipe 171 in accordance with arrows 188 and 196, through the opening 186 to rotate the rotor. The fluid 185 flowing out of the bottom of the opening 186 flows out to the annulus of the borehole through a plurality of circumferential openings 184.

There is an upwardly extending outer wall 173 of the rotor, which freely rotates with a selected minimum clearance inside the pipe 171. There are one or more openings 194 in a horizontal plane in the wall 173. There are also one or more openings 190 in the wall of the pipe 171 which are coplanar with 194.

The azimuthal relation of opening 194 in the rotor wall 173 and openings 190A, 190B, 190C, 190D in the pipe 171 are shown in FIG. 9. In the position of rotor 174 shown in FIG. 9, fluid 188 can flow out 198 through openings 194 and 190, although a selected portion of the total flow will continually flow through the turbine 186, rotating the rotor.

Consider FIG. 9, and consider the rotor turning clockwise, in accordance with arrow 201, at a selected angular velocity. Fluid will flow through 194 and successively through 190A, and 190B. Then as the rotor turns farther, the opening 194 comes up against the blank wall 210, and the part of the flow 198 is cut off, though 196 continues. The inertia of the long column of liquid in the pipe causes it to continue to flow, compressing the liquid below. If there was no flow through 186, there would be a very high pressure built up inside the rotor.

With partial flow through 186, the peak pressure will be reduced, in relation to the fraction still passing. This pressure is retained until the opening 194 reaches 190C, when the highly compressed liquid explosively expands into the annulus. This process repeats itself when 194 passes the end of 190D, and so on. Thus, a series of SPP's are produced at a frequency corresponding to the number of openings 190A, B, and 190 C,D.

If there are 3 sets of openings 190, the frequency will increase by 50%. If the opening or turbine is enlarged or reduced in diameter, or if the angles of the blades 200 are changed, the speed and frequency will correspondingly change.

In FIG. 8, a second coplanar plurality of openings 192 are shown spaced above 190 in the outer wall 171. If the number of openings 192 are different from 190, then by lifting post 181 by means (not shown) attached to the post 181 at 187 until the opening 194 is coplanar with 192, then the discharge of 198 through 192 would be at a different frequency and so on. If the rotor were driven by an electric motor instead of the turbine 186, then by varying the speed of the electric motor (not shown), by well-known means, any desired frequency of SPP's could be provided. Also, by avoiding the presence of opening 186, much higher shock pressures can be provided. Such higher shock pressures would be desirable to maintain the processes described in connection with FIG. 7, particularly for great lengths of fractures.

While I have described my invention in terms of substantially vertical fractures in deep boreholes, it, of course, applies to tilted, nearly vertical fractures, and those at shallow or intermediate depth in the earth.

It also applies, in general, to fractures in near surface rocks, which may contain veins of minerals to be removed chemically. These can include horizontal or tilted veins or formations, such as tar sands, or formations containing viscous oil or tar. Other veins of mineral such as coal, zinc, copper, etc. can be mapped.

It also applies to open, liquid-filled fissures in the earth at any angle. However, for horizontal fractures or fissures, a plurality of azimuthly spaced vertical arrays of sensors, such as array 76 in borehole 92B of FIG. 5 would be particularly useful. These arrays can be either above, or below the plane of the fissure. Such fissures could also be water-filled tunnels or cavities at selected depth in the earth.

What has been described is a method and apparatus for fracturing deep boreholes more efficiently, by the use of one or more shock pressures applied by a source in the borehole. Also described is a seismic method of monitoring the process of fracturing and monitoring the presence of extension of the fracture. Further described is a method of determining that a fracture exists, and if so, what its azimuth is, and also information as to its length.

The determination of the azimuth can be made while the fracturing is in process. However, it can also be carried out at any time after the fracture has been made. It can also be used for mapping waterfilled tunnels, fissures, and cavities.

While I have described my invention in terms of seismic sensor arrays which only partially surround said borehole, the optimum method would be to provide the arrays, such as shown in FIG. 6 (for example) to symmetrically surround the borehole on the surface. Therefore, since the resulting azimuth of the borehole may be in any direction and is not known beforehand, the arrays will be in the best possible position to detect the direction of propagation of the seismic waves.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A method of creating a deep vertical fracture in an earth formation into which a deep borehole passes, comprising the steps of:
   (a) Inserting into said borehole from the surface a long pipe, and packing off a selected section, at a selected depth in said borehole, between said pipe and the wall of said borehole, so that the fluid in said pipe can flow to the wall of said borehole within said section.
   (b) pumping a selected fracturing fluid down said pipe to said section, at a selected average bottom hole pressure PA, where the average pressure PA is less than the normal fracturing pressure (NFP), normally required to fracture the rock in said borehole at said depth; while simultaneously
   (c) exposing the fluid in said section to a sequential plurality of closely spaced sharp pulses of positive shock pressure (SPPSP) of such magnitude that when superimposed on said bottom hole, average pressure PA will be higher than said (NPF), and high enough to cause incipient fractures in the rock wall of said borehole;
   whereby said borehole will be fractured at a lower average pressure than said NFP, normally required to fracture said borehole in the conventional manner.

2. The method as in claim 1 and including the steps of positioning, at at least three spaced points, at selected positions on or below the surface of the earth in the vicinity of said borehole, vibrational seismic sensors for detecting the seismic waves generated by said SPPSPs in said borehole.

3. The method as in claim 2 including the steps of detecting at said at least three points the horizontal shear seismic waves resulting from said pressure pulses; and determining their direction of propagation.

4. The method as in claim 2 including at least a part of a circular array of sensors centered at said borehole, and at a selected radius from said well.

5. The method as in claim 4 in which at least some of said sensors are compressional wave seismic sensors.

6. The method as in claim 4 in which said at least some of said sensors are shear wave seismic sensors.

7. The method as in claim 4 in which two of said circular array parts are superimposed with one compressional, and at least one shear sensor positioned at each of the points of at least two arrays.

8. The method as in claim 7 in which the detected signals from at least two sets of said sensors are compared with each other, at each of the points of an array.

9. The method as in claim 1 in which said at least one sharp pulse of fluid pressure is generated by the steps of
   (a) momentarily closing off at least a portion of the flow of said fluid in said pipe, near said section; and
   (b) after a selected short time interval again initiating the previous full flow.

10. The method as in claim 9 in which said step of closing off comprises the step of closing off a selected portion of the complete flow of said fluid through said pipe.

11. The method as in claim 5 in which at least two horizontal component compressional geophones are provided at each sensor point, and in which one component lies in a plane through the axis of said well, and the other component is perpendicular to that plane.

12. The method as in claim 5 in which said sensors at each of said points comprise two horizontal shear wave detectors, with their axes orthogonal to each other, in a horizontal plane, with the axis of one sensor in a radial plane to said borehole.

13. The method as in claim 5 in which said at least two points are part of a plurality of points arranged in two orthogonal straight lines, and in which a radial plane through the borehole passes through the junction between said two lines, and makes a selected angle with each of the vertical planes through said lines.

14. The method as in claim 1, including the step of continuing pumping of said fluid, and continuing said SPPSP's, whereby said fracture will be extended in length.

15. The method as in claim 14 and including the steps of detecting at a plurality of sensors, arranged at or near the surface of the earth in the vicinity of said well bore, in a two-dimensional array, the seismic waves set up at said fracture by said series of SPPSP's, and providing corresponding electrical signals.

16. The method as in claim 15 including the step of detecting by comparison of said electrical signals the directions of propagation.

17. The method as in claim 16 including the step of determining from said directions of arrival the time pattern of wave propagation from said fracture, and the azimuth and length of said vertical fracture.

18. The method as in claim 15 including the step of temporarily storing said received electrical signals, and stacking said electrical signals.

19. The method as in claim 18 including the step of determining from said stacked signals the direction of propagation of said waves.

20. The method as in claim 16 including the step of comparing said directions of propagation at successive spaced time intervals after the initiation of said fracture.

21. The method of detecting the azimuth of a deep liquid-filled open fracture or fissure in the earth, comprising the steps of:
   (a) creating in said liquid in said fracture or fissure a plurality of sharp positive pulses of shock pressure (SPPSP); while (b) detecting at the surface, by means of a two-dimensional pattern of selected seismic sensors the pattern of seismic wave motion at or below the surface resulting from said plurality of sharp positive pulses of shock pressure.

22. The method as in claim 21 including the additional step of determining the direction of arrival at at least two spaced sensors of said seismic wave motion.

23. The method as in claim 21 including the step of providing an increased hydrostatic pressure in said liquid-filled open fracture.

24. In a deep well drilled to a geological formation in which a vertical fracture has been formed and propped open, the method of determining the azimuth of said fracture comprising the steps of:

(a) at each of a plurality of points spaced around said well at or near the surface of the earth, positioning at least one vibrational seismic sensor capable of detecting seismic waves in the earth, and generating corresponding electric signals;

(b) creating at the bottom of said well a plurality of sharp positive pulses of shock pressure, capable of generating seismic waves in the earth;

(c) recording the electrical signals from said sensors and determining the direction of propagation of said seismic waves.

25. The method as in claim 24 including the additional step after step (a) and before step (b) of injecting a selected fluid at a selected pressure into the bottom of said well.

* * * * *